United States Patent

Nishii

[11] Patent Number: 6,106,086
[45] Date of Patent: Aug. 22, 2000

[54] FACSIMILE APPARATUS

[75] Inventor: Teruyuki Nishii, Tokyo, Japan

[73] Assignee: Canon Kabushiki Kaisha, Tokyo, Japan

[21] Appl. No.: 08/684,970

[22] Filed: Jul. 19, 1996

[30] Foreign Application Priority Data

Jul. 26, 1995 [JP] Japan .................................. 7-190092

[51] Int. Cl.[7] .............................. B41J 29/38; B41J 2/175; H04N 1/034
[52] U.S. Cl. ...................................... 347/3; 347/4; 347/86
[58] Field of Search .................................. 347/3, 14, 12, 347/30, 85, 86, 87, 19; 358/296

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,206,668 | 4/1993 | Lo et al. | 347/12 |
| 5,276,459 | 1/1994 | Danzuka et al. | 347/14 |
| 5,315,397 | 5/1994 | Inoue | 358/296 |
| 5,592,200 | 1/1997 | Kaneko | 347/30 |
| 5,610,634 | 3/1997 | Murata et al. | 347/5 |
| 5,617,122 | 4/1997 | Numata et al. | 347/14 |
| 5,623,290 | 4/1997 | Iida et al. | 347/7 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

A facsimile apparatus capable of reliable printing after exchanging an ink cartridge. When removal and replacement of an ink cartridge is detected, a predetermined pattern is printed on a print sheet. The printing is performed employing a pattern which actuates all ink nozzles of a printhead to discharge ink. A user of the apparatus visually inspects and confirms the inspection pattern and presses a start button if the user determines that normal printing is performed, but presses a stop button if the user determines that normal printing is not performed. When the start button is pressed, the subsequent printing operation is performed, but when the stop button is pressed, the subsequent printing operation is suppressed.

17 Claims, 11 Drawing Sheets

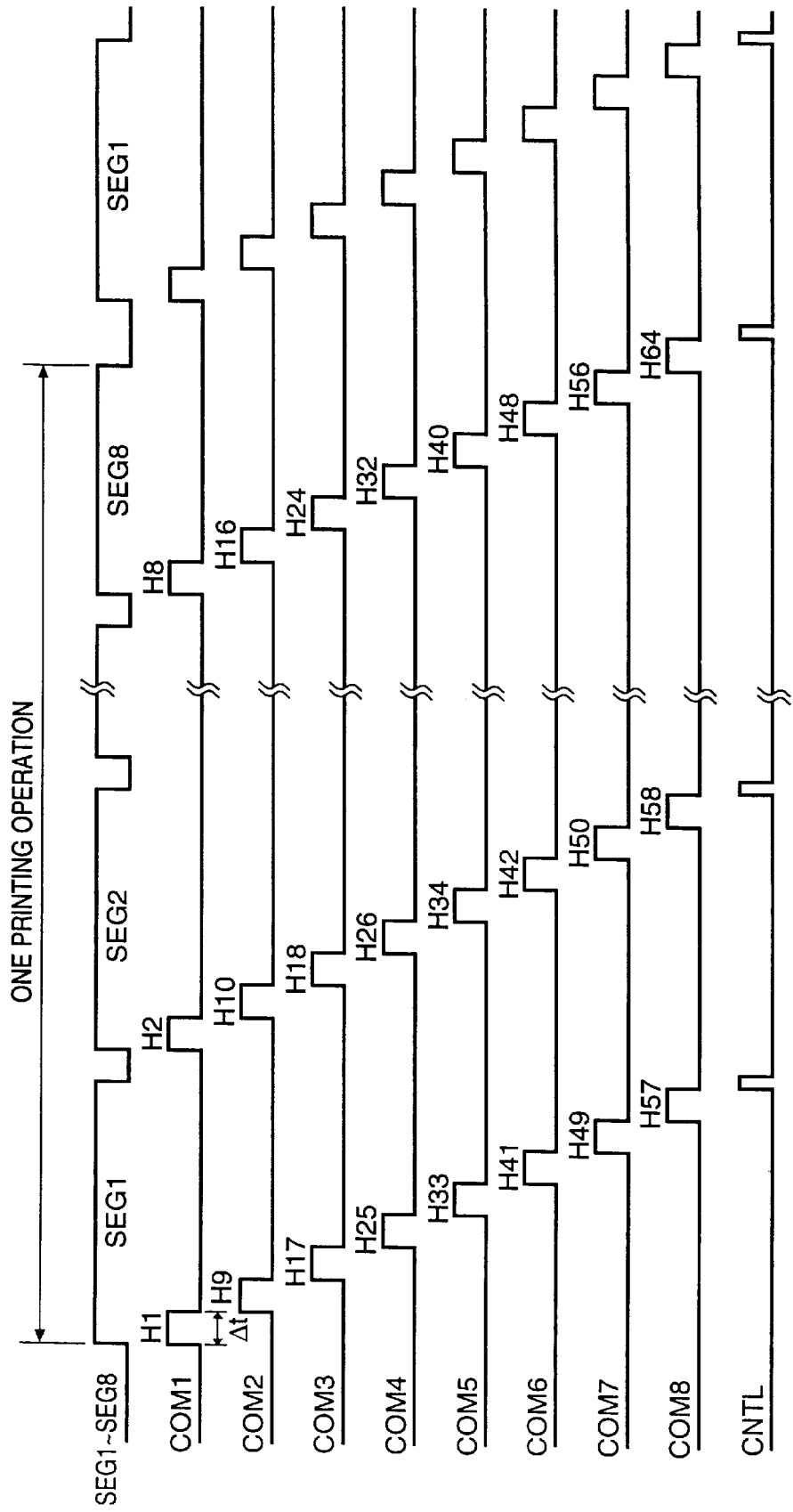

PLEASE CHECK THE DRAWING BELOW.
IS THE DRAWING PROPERLY PRINTED?

IS THERE ANY WHITE LINE OR SCRATCH IN THE DRAWING?

PLEASE PRESS THE START BUTTON WHEN YOU CONFIRM QUALITY OF PRINTING.

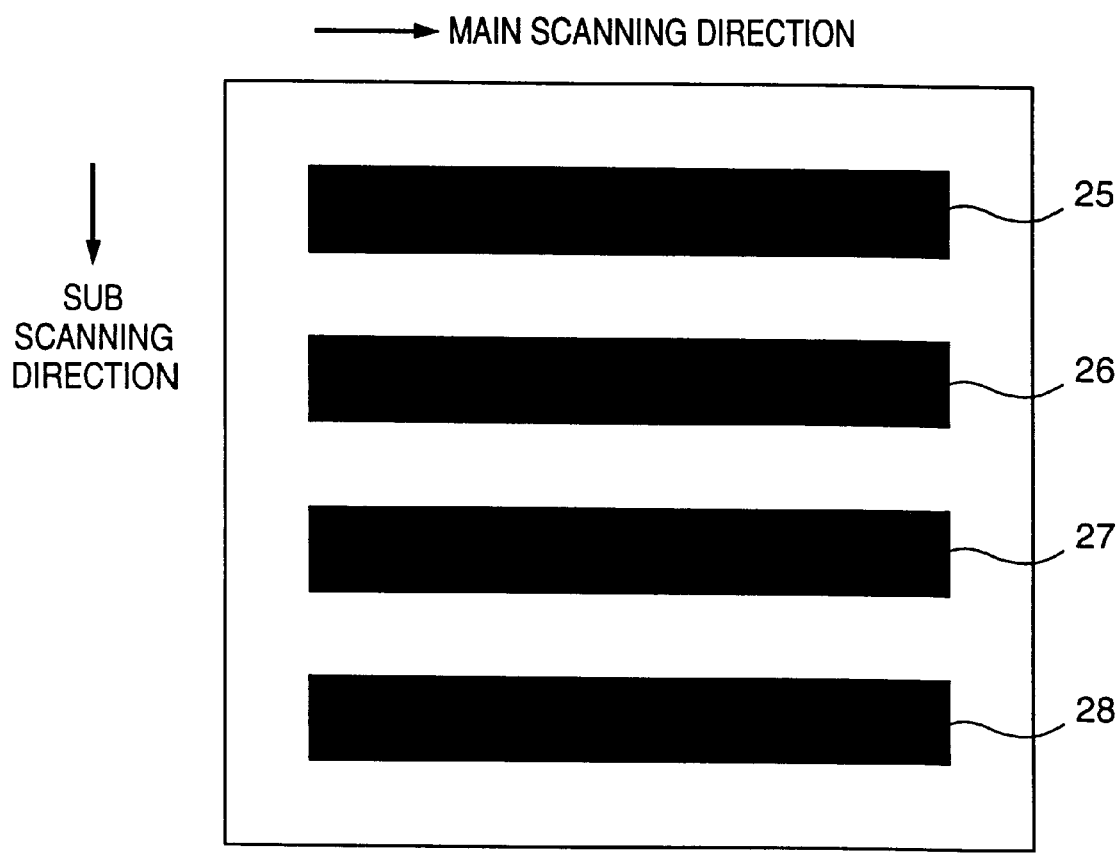

FACSIMILE APPARATUS

BACKGROUND OF THE INVENTION

Present invention relates to a facsimile apparatus and, more particularly, to a facsimile apparatus having a printing unit complying with an ink-jet printing method.

In a facsimile apparatus having a printing unit for performing print operation according to an ink-jet printing method by reciprocally scanning a carriage having a printhead, when an ink cartridge which supplies ink to the printhead is exchanged, conventionally known technique is to manually perform preliminary ink suction recovery operation by a user, or to detect exchange of an ink cartridge in the apparatus and automatically perform preliminary ink suction recovery operation, in order to stabilize ink supply from a new ink cartridge and discharge of ink droplet from the printhead.

However in the above conventional example, neither the case where the ink suction recovery operation is manually performed by a user nor the case where the ink suction recovery operation is automatically performed by an apparatus observing for cartridge exchange, verifies whether or not the apparatus is in a state of normal printing operation after the ink suction recovery operation. Therefore, it was problematic, for instance, when a user discovers abnormal printing operation due to discharge failure of ink droplet after an image is received via facsimile communication and printed, contents of the received image is unreadable despite the fact that facsimile communication was normally performed, because the received image data was already deleted from a memory.

SUMMARY OF THE INVENTION

The present invention has been made in consideration of the above situation, and has as its object to provide a facsimile apparatus which can confirm quality of print image in printing operation after an ink cartridge is exchanged.

According to the present invention, the foregoing object is attained by providing a facsimile apparatus including a printing unit for performing printing operation on a printing medium by discharging ink from a printhead, comprising a removable ink cartridge for storing the ink, a detector for detecting removal and attachment of the ink cartridge, a print controller for controlling the printing unit according to a detection result by the detector, to discharge ink by utilizing an ink cartridge which is attached and print a predetermined test pattern on a printing medium, and a processor for determining whether or not subsequent printing is to be performed based on a printed result of the predetermined test pattern.

It is another object of the present invention to provide an image printing method for confirming quality of print image in printing operation after an ink cartridge is exchanged.

According to the present invention, the foregoing object is attained by providing a print control method operative in a facsimile apparatus including a printing unit for performing printing operation on a printing medium by discharging ink from a printhead and an ink cartridge for storing ink, comprising the steps of detecting removal and attachment of the ink cartridge, controlling the printing unit according to a detection result of the detecting step to discharge ink by utilizing an ink cartridge which is attached and print a predetermined test pattern on a printing medium, and determining whether or not subsequent printing is to be performed based on a printed result of the predetermined test pattern.

In accordance with the present invention as described above, when printing is performed by printing means which performs printing on a printing medium by discharging ink stored in an ink cartridge removable from a printhead, removal and attachment of the ink cartridge is detected, the printing means is controlled to print a predetermined test pattern on a printing medium by discharging ink utilizing an attached ink cartridge, and whether or not subsequent printing operation is to be performed is determined in accordance with the printed result of the predetermined test pattern.

Herein, the determination may depend upon an instruction from a user by indicating a message requesting user's determination.

Alternatively, the determination may depend upon a result of inspection obtained by a sensor performing inspection of the printed predetermined test pattern.

Moreover, the present invention may comprise a communication unit which performs facsimile communication by a communication line and a memory for storing data received by the communication unit via the communication line.

In this case, if it is determined that subsequent printing operation after printing of the predetermined pattern is not to be executed, data received by a facsimile communication is stored in the memory.

Note that the above described printhead has plural nozzles for discharging ink, and the predetermined test pattern is printed by utilizing ink discharge from all the plural nozzles.

The above printhead may be an ink-jet printhead which performs printing by discharging ink, or a printhead which discharges ink by utilizing heat energy configured with a heat energy transducer for generating heat energy to be provided to ink.

The invention is particularly advantageous since important image data received by facsimile communication will not be lost because of a printing error, and reliable image output is assured, either in the case where, for instance, determination of whether or not printing after exchanging an ink cartridge is to be performed depends upon user's visual confirmation of a printed predetermined test pattern, or the case where determination depends upon a result of inspection executed automatically by inspecting the test pattern.

Other features and advantages of the present invention will be apparent from the following description taken-in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a time chart illustrating relationships between common signals (COM1 to COM8) and segment signals (SEG1 to SEG8) in printing operation;

FIG. 11 is a diagram showing an example of an image (test) pattern for image quality inspection utilized in the second embodiment.

DETAILED DESCRIPTION OF THE PREFERRED EMBODIMENT(S)

Preferred embodiment(s) of the present invention will be described in detail in accordance with the accompanying drawings.

Figure 1:
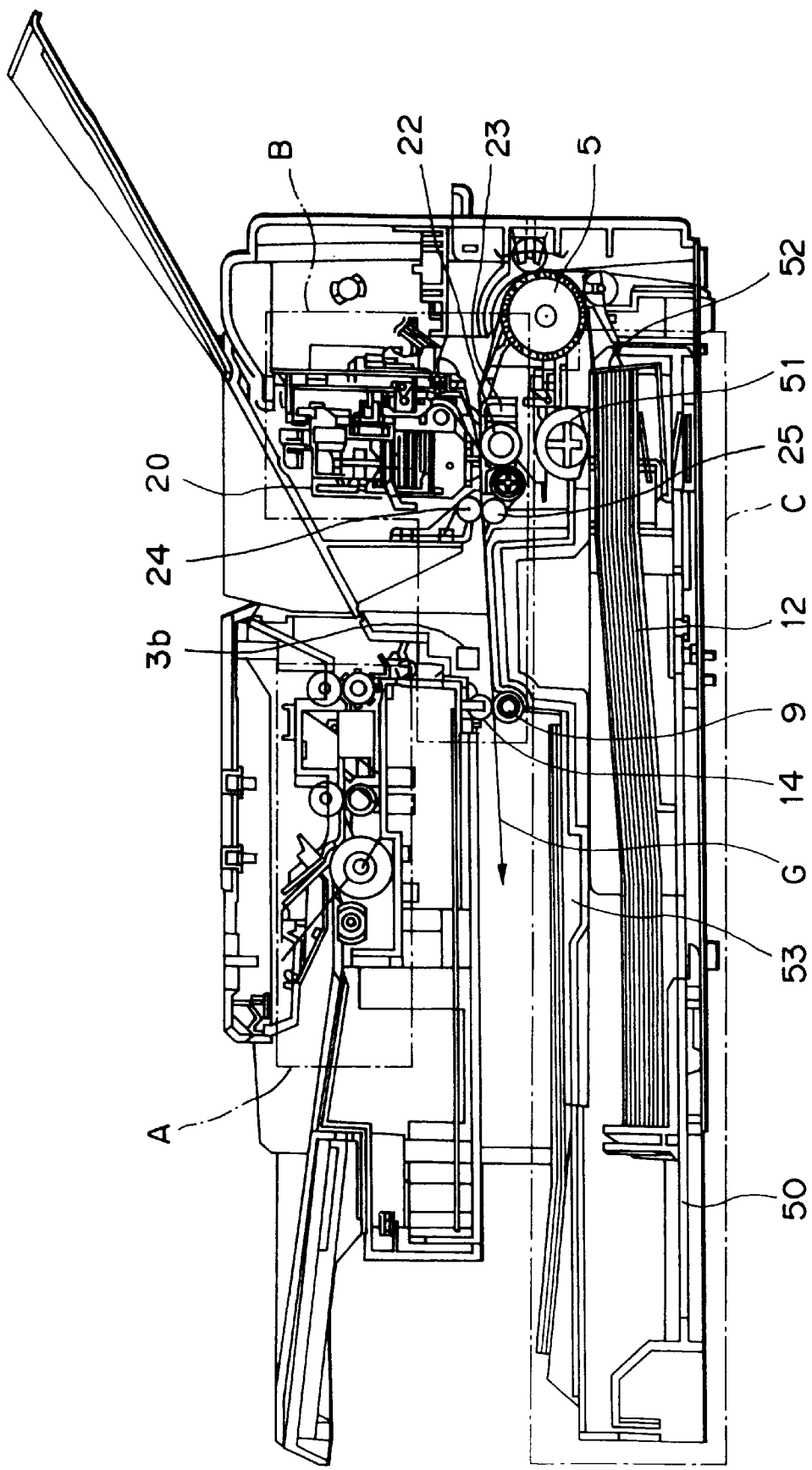
FIG. 1 is a sectional view showing a structure of a facsimile apparatus which is a typical embodiment of the present invention.

FIG. 1 is a sectional side view showing a structure of a facsimile apparatus which is a typical embodiment of the present invention. In FIG. 1, reference portion A denotes a reading unit for optically reading an original image; B, a printer unit including a printhead which performs printing operation according to an ink-jet printing method and an ink tank which supplies ink to the printhead; and C, a paper feed unit (often referred to as "conveyance unit") for separately supplying a cut-sheet as a print sheet loaded in a cassette a sheet by sheet to the printer unit B. The printhead and ink tank integratedly construct an exchangeable ink cartridge.

In the apparatus having a structure shown in FIG. 1, printing operation on a print sheet is performed in the manner described below. A print sheet 12 loaded in a cassette 50 is picked up by a feeding roller 51 and a separation claw 52, and conveyed by a conveying roller 15 to be fed to the printer unit B. Then, in the printer unit B, a printhead 20 reciprocally scans in a vertical direction of the drawing sheet of FIG. 1 and performs printing operation by discharging ink on the print sheet. The scanning direction of the printhead 20 is called main scanning direction. Each time one scanning of printing operation is completed, the print sheet 12 is conveyed in a direction of an arrow G for a width of one scanning of the printhead 20. Printing operation proceeds in the above described manner. When printing operation on the print sheet 12 is completed, the print sheet 12 is outputted by conveying rollers 14 and 19 made of rubber or the like and stacked at a stacker 53.

Note that a photosensor 3b is arranged between conveying rollers 14, 19 and 24, 25. A test pattern printed on the print sheet 12 is read by the photosensor 3b, and print quality of a printhead integrated in the ink cartridge can be inspected from the printed result.

The photosensor 3b, conveying rollers 14, 19, 24 and 25 will be described later in detail with reference to FIG. 9.

<First Embodiment>

Figure 2:
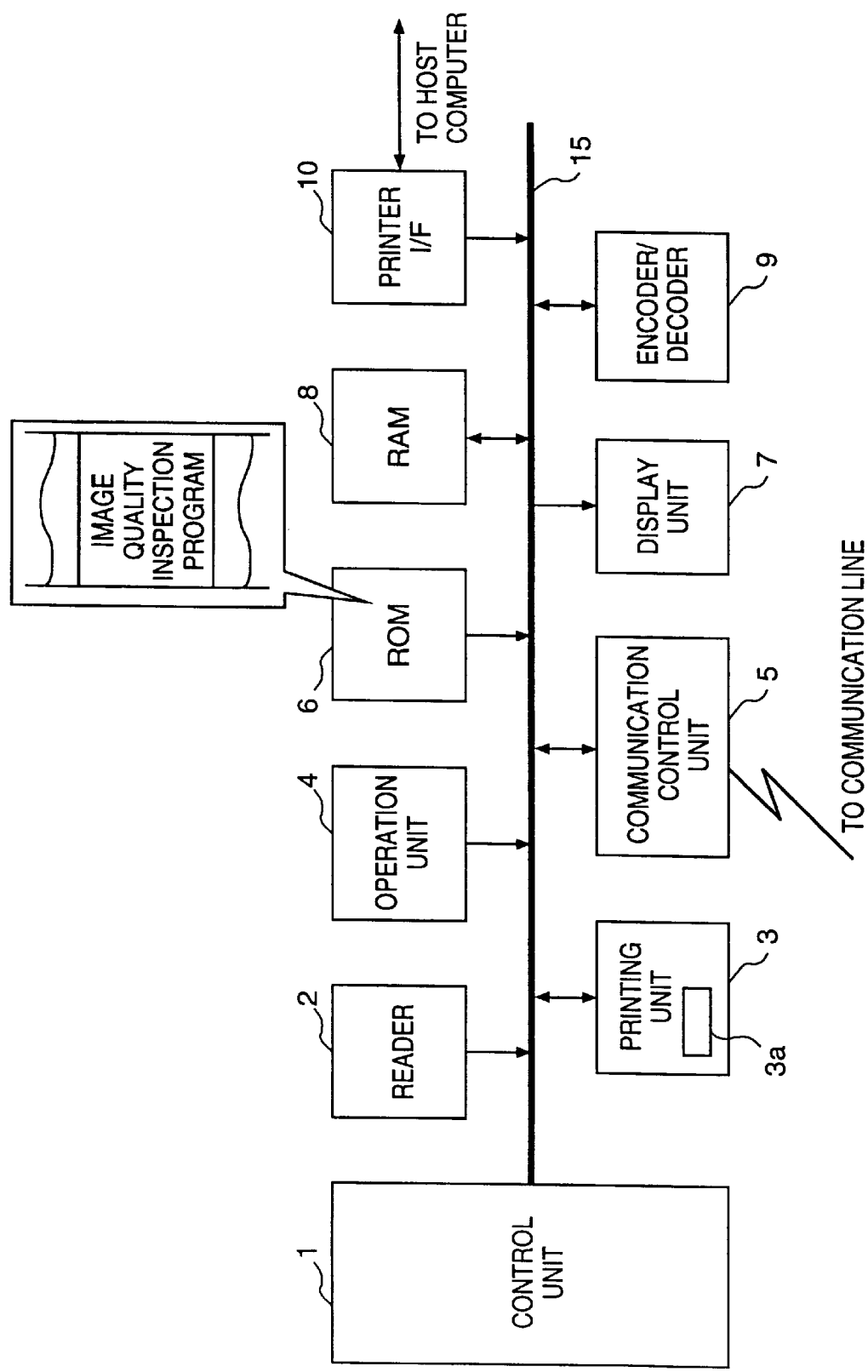
FIG. 2 is a block diagram showing a structure of a facsimile apparatus according to the first embodiment of the present invention.

FIG. 2 shows a block diagram of a facsimile apparatus utilized in the first embodiment. Printing operation by the facsimile apparatus utilizes a printing unit which performs printing by a printhead according to the ink-jet printing method.

In FIG. 2, reference numeral 1 denotes a control unit for controlling an entire apparatus, configured with a micro processor unit (MPU) or the like; 2, a reader comprising a scanner for reading an original document; 3, a printing unit complying with the ink-jet printing method for performing image printing according to received image signals or read image signals, and outputting various reports according to an instruction from the control unit; 3a, an ink cartridge removing/placing detection sensor; 4, an operation unit for an operator to instruct image transmission, image copying or report output, register a telephone number of a called party, or give various instructions such as response to a displayed message and the like; and 5, a communication control unit configured with a modem, NCU (network control unit) and the like, for sending and receiving communication data. The printing unit 3 comprises a printhead and an exchangeable ink cartridge which will be described later. Note that the operation of the MPU includes not only printing operation control by the printing unit 3 but also processing according to a flow chart in FIG. 9 which will be described later.

Moreover, reference numeral 6 denotes a ROM for storing various processing programs including a control program and an image quality inspection program, which will be described later, performed by the control unit 1; 7, a display unit consisting of an LCD or the like for displaying guidance messages for registering telephone numbers, various warning messages, time, transmission/reception state of an image and the like; 8, a RAM utilized as a work area when the control unit 1 executes a control program or a processing program, or utilized for storing various constant values inputted by an operator from the operation unit 4 or storing image data to be transmitted or received; 9, an encoder/decoder for performing encoding and decoding; 10, a printer I/F (interface) unit which consists of a centronics connector or a driver widely used for a printing apparatus, for controlling input/output of various commands and data between a host computer (hereinafter referred to as a host) and the apparatus; and 15, a common bus which connects each of the components.

Figure 3:
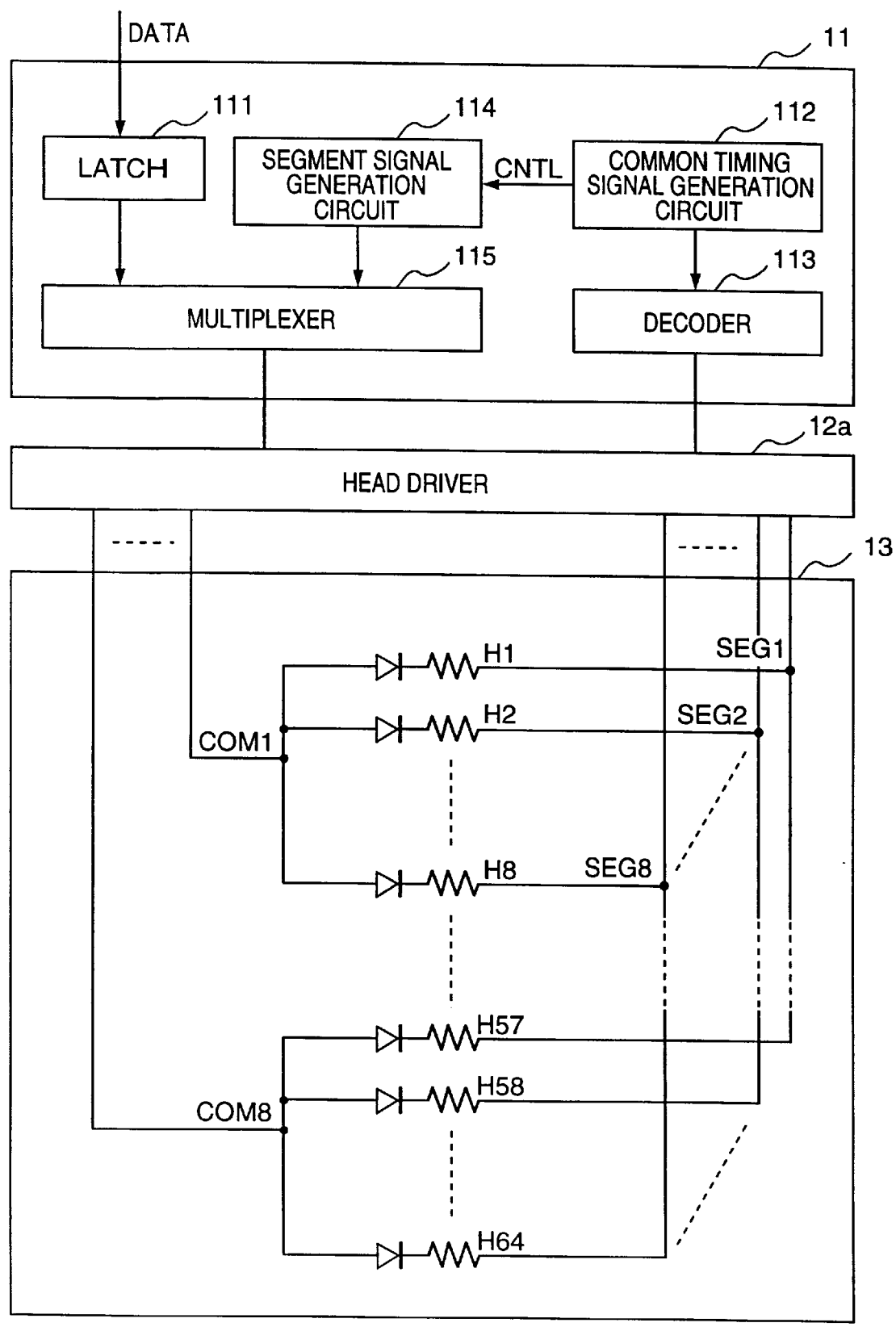
FIG. 3 is a block diagram showing a structure of a main portion of a printing unit.

FIG. 3 shows a block diagram of the main portion of the printing unit 3. The printing unit comprises a feeding/conveying mechanism for feeding and conveying a printing medium such as a print sheet, and carriage for reciprocally moving a printhead over a print sheet as well as its moving mechanism. Since these mechanisms are already well known, they are not shown in FIG. 3. An ink cartridge is placed in the printhead for supplying ink for printing. When the cartridge is placed, this state is detected by the ink cartridge removing/placing detection sensor 3a and the detection result is sent to the control unit 1.

Note that the printing unit 3 in the first embodiment is for monochrome printing. The printhead explained herein has sixty-four nozzles for discharging ink droplets along the conveying direction of a printing medium. It is assumed herein that the sixty-four nozzles are divided into eight nozzle-groups each of which having eight nozzles, in two different ways which will be described later. One bit of image data is fed to one nozzle; if a bit value is "1 (ON)", ink droplet is discharged from a corresponding nozzle to perform printing, and if the bit value is "0 (OFF)", no ink droplet is discharged from the corresponding nozzle.

In the descriptions given below, the moving direction of a carriage having printheads is referred as a main-scanning direction, and the conveying direction of a printing medium (a direction of which nozzles are arranged) is referred as a sub-scanning direction.

In FIG. 3, reference numeral 11 denotes a print data generation unit for selecting a latch and a nozzle group for print data; 12a, a head driver which drives a printhead by two types of signals (segment signal SEG1 to SEG8 and common signal COM1 to COM8); and 13, a logical circuit of a printhead.

The print data generation unit 11 consists of a latch circuit 111, which inputs image data stored in the RAM 8 by the control unit 1, for every 64 bit (8 byte) for latching, a common timing generation circuit 112 for generating common signals COM1 to COM8, a decoder 113 for decoding the common signals COM1 to COM8 and outputting the decoded signals to the head driver 12a, a segment signal generation circuit 114 for generating segment signals SEG1 to SEG8 in synchronous with generation of the common signals COM1 to COM8 in a predetermined timing which will be described later, and a multiplexer 115 which multiplexes the image data byte by byte latched to the latch circuit 111 with any one of the segment signals SEG1 to SEG8 and outputs the multiplexed signal to the head driver 12a.

The common timing generation circuit 112 sequentially generates eight common signals COM1 to COM8.

The logical circuit 13 in the printhead has sixty-four heaters (H1 to H64) in correspondence with sixty-four nozzles, each heater having a resistor which generates heat according to the applied electric current flowing through diode and the resistor. Herein, the heaters H1 to H64 are divided into eight groups (H1, H9, H17, ..., H57; H2, H10, ..., H58, ...; H8, H16, ..., H64) and each of the nozzle-groups is selected by the segment signals SEG1, SEG2, ..., SEG8. Further the heater H1 to H64 are divided in a different manner into eight groups (H1 to H8, H9 to H16, H17 to H24, H25 to H32, H33 to H40, H41 to H48, H49 to H56, H57 to H64) and each of the nozzle-groups is selected by the common signals COM1, COM2, ..., COM8.

FIG. 4 is a time chart showing the relationship between the common signals (COM1 to COM8) and the segment signals (SEG1 to SEG8) in printing operation. In FIG. 3, the reference numeral H1, H2, ..., denote heaters to which driving current is applied when corresponding common signals (COM1 to COM8) and segment signals (SEG1 to SEG8) are "ON." As shown in FIG. 4, while one of the segment signals, for example, SEG1 is turned "ON", common signals COM1, COM2, ..., COM8 are sequentially turned "ON" for a predetermined period of time ($\Delta t$). Then while another of the segment signals, for example, SEG2 is turned "ON", common signals COM1, COM2, COM8 are again sequentially turned "ON" for a predetermined period of time ($\Delta t$). In the above manner, printing operation is executed by having driving current flow to a group of heaters (H1 to H64) at which both the common signal and the segment signal are "ON", ink is heated up by the heaters, and ink droplets are discharged from the corresponding nozzles. As a result, electric current is sequentially sent to all sixty-four heaters and printing operation at a printhead portion is completed.

Further, when the common signals COM1, COM2, ..., COM8 are sequentially turned "ON" and one cycle is completed, the common timing generation circuit 112 outputs a control signal CNTL to the segment signal generation circuit 114. Each time the control signal CNTL is received, the segment signal generation circuit 114 sequentially switches the segment signal as SEG1 → SEG2 →, ..., → SEG8.

Note that in the time chart in FIG. 4, the segment signals (SEG1 to SEG8) maintain the "ON" state while the common signals COM1, COM2, ..., COM8 are sequentially turned "ON" ($8 \times \Delta t$) for a predetermined period of time ($\Delta t$). However, since the segment signals (SEG1 to SEG8) are the result of multiplexing (e.g. logical product) the latched image data, if a value of image data for a pixel is "0 (OFF)", the corresponding time and the segment signals (SEG1 to SEG8) would become "OFF"; therefore electric current is not supplied to the heater, thereby no ink droplet is discharged.

FIGS. 5A to 5G show a principle of discharging an ink droplet from a printhead in the ink-jet printing method.

Figure 5A:
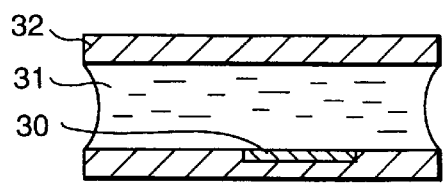
FIGS. 5A, 5B, 5C, 5D, 5E, 5F and 5G are diagrams illustrating a discharge sequence of ink droplet.
Figure 5B:
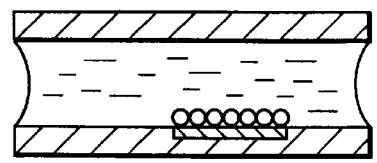
Figure 5C:
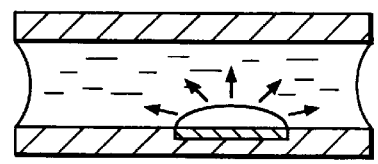

In the stationary state, as shown in FIG. 5A, ink 31 filling a nozzle 32 is in a state where the surface tension of the ink at an orifice is equilibrium to external pressure. In order to discharge the ink under this condition, first, an electric current is supplied to an electrothermal transducer 30 which is in the nozzle to cause a rapid rise in temperature to the ink in the nozzle over a film boiling temperature. Accordingly, as shown in FIG. 5B, the ink 31 neighboring to the electrothermal transducer 30 is heated up and tiny bubbles are created, then the heated portion of the ink vaporizes, thus reaching the film in boiling state. As a result, a bubble rapidly grows as shown in FIG. 5C.

Figure 5D:
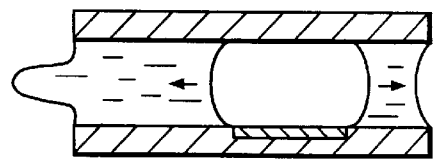
Figure 5E:
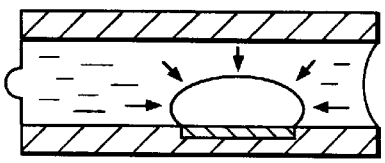

When the bubble grows to the maximum as shown in FIG. 5D, an ink droplet is forced out from an orifice of the nozzle. Then, after stopping the supply of electric current to the electrothermal transducer 30, the grown bubble cools down in the nozzle and shrinks as shown in FIG. 5E. As described above, an ink droplet is discharged from the orifice by growth and shrinkage of the bubble. The size of the ink droplet 33 can be controlled by electric current supply time and sequence to the electrothermal transducer 30.

Figure 5F:
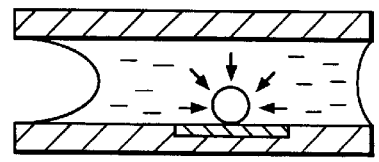
Figure 5G:
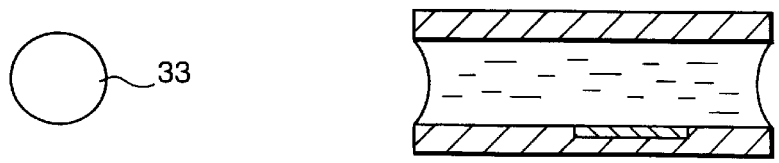

Further, as shown in FIG. 5F, the ink adjacent to the surface of the electrothermal transducer 30 is rapidly cooled down, and the bubble disappears or shrinks to an ignorable volume. As the bubble shrinks, ink is provided from a common ink chamber to the nozzle, caused by a capillary phenomenon, and ready for the next current supply as shown in FIG. 5G.

Therefore, by reciprocally moving a carriage with such a printhead and discharging ink droplets from the nozzle caused by supplying an electric current to an electrothermal transducer in response to image signals generated in synchronization with the carriage movement, an image in ink is printed on recording medium, such as a print sheet.

In the principle as described above, an ink droplet is formed in accordance with an image signal, thereby an image is printed on recording medium.

Figure 6:
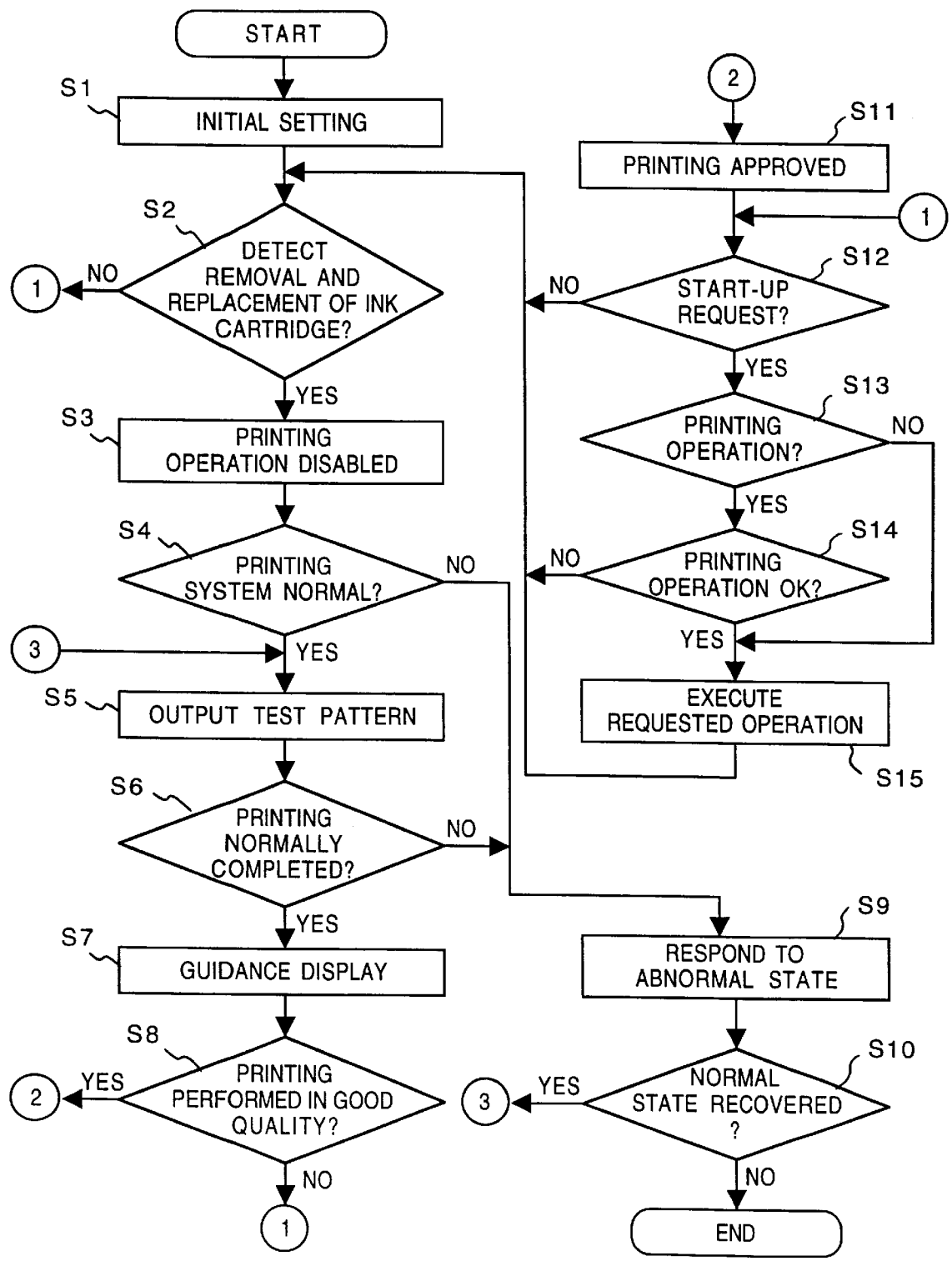
FIG. 6 is a flowchart explaining a processing of inspecting quality of a printed image according to the first embodiment.

Next, image quality inspection processing performed by a facsimile apparatus having the above described configuration will be described with reference to the flowchart in FIG. 6. Note that the processing is performed by executing an image quality inspection program stored in the ROM 6. Herein, an ink cartridge integrating a printhead and ink tank for storing ink is utilized.

First, power of the apparatus is turned on, the control unit 1, printing unit 3, and reader 2 are initialized in step S1, and initial setting such as initializing the RAM 8 is performed. After completing initialization, removal and replacement of an ink cartridge is observed in step S2.

The ink cartridge normally stays in a predetermined position (home position) in a print-operation stand-by state, capping ink discharge nozzles of the printhead so that they are not dried out. A small amount of ink is discharged immediately before printing (preliminary discharge) to adjust discharging of ink droplet, and for a case where printing operation is not performed for a long time, ink suction recovery operation, so-called recovery operation, is performed to stabilize discharge of ink. Meanwhile, when an ink cartridge is exchanged, the recovery operation is executed similar to the case where printing operation is not performed for a long time, since the state of ink discharging nozzles of a printhead cannot be determined for a newly-placed ink cartridge.

With the above operation, when removal and replacement of an ink cartridge is not detected in step S2, processing proceeds to step S12; and when removal and replacement of an ink cartridge is detected, the processing proceeds to step S3 where printing operation at the printing unit 3 is temporarily halted. At this time, the MPU sets a flag (DIS/ENB) in a predetermined area established in the RAM 8, indicating disabled printing operation. In step S4, the state of the printing unit 3 is checked. Checking is performed not only for whether or not an ink cartridge is placed, but also for whether or not there are print sheets or ink residue, an operation state of preliminary discharge performed by a newly-placed ink cartridge, and a mechanically driven unit including recovery operation.

Figure 7:
FIG. 7 is a diagram showing an example of an image (test) pattern for image quality inspection utilized in the first embodiment.

Herein, if it is determined that the foregoing operation states are normal and printing operation is possible, the processing proceeds to step S5 where an inspection pattern shown in FIG. 7 is outputted. The inspection pattern is printed utilizing all nozzles of the printhead so that abnormality of a nozzle among those assembled in the printhead can be detected by looking at the inspection pattern. Also, a guidance message (e.g. "please press the start button when you confirm the quality of printing") as shown in FIG. 7 is printed at the same time to allow a user of the apparatus to confirm the printed state. If abnormality is detected at the printing unit 3, the processing proceeds to step S9.

Next, whether or not outputting of the inspection pattern was normally performed is examined in step S6. If the outputting was not normally performed due to an operational failure of a driving motor or the like, the subsequent process is halted and the processing proceeds to step S9. Meanwhile, if the inspection pattern is normally outputted without consideration of its print quality, the processing proceeds to step S7. Taking a case into consideration where the guidance message is unreadable from the image printed by the newly-placed ink cartridge, a message similar to the guidance message is displayed at the display unit 7, that is, "Is data properly printed? if OK, please press the start button, if not, please press the stop button" in step S7.

Moreover in step S8, the user visually confirms whether the inspection pattern is printed in good quality. If the user determines that printing is in good quality, the user presses a start button according to the guidance in step S5 or step S7; meanwhile, if the user determines that printing is not in good quality, the user presses a stop button. When the start button is pressed, (printing approved), the processing proceeds to step S11 where print-disabled state is canceled. At this point, the MPU resets the flag (DIS/ENB) established at the RAM 8. By this, normal operation of the subsequent printing becomes possible. On the other hand, when the stop button is pressed (printing disapproved), the processing proceeds to step S12.

In the foregoing configuration, approval or disapproval of printing is selected by pressing the start button or stop button; however, the approval may be selected by pressing a dial number button in a facsimile apparatus, or other special button may be provided.

In step S9, a follow-up operation is performed in response to abnormality determined in step S4 or step S6. For instance, replenishing with print sheets or check-up of other failure is performed. In step S10, whether or not normal operation is resumed on account of the follow-up operation in step S9 is determined. If it is determined herein that the normal operation is recovered, the processing returns to step S5; however, if the normal operation is not recovered, the processing ends, concluding that maintenance is required such as exchanging parts.

In step S12, it is determined whether or not there are any key inputs from the operation unit 4, reception of any calling signals from a transmitting apparatus, or instructions or requests for facsimile transmission with time designation. Herein, if such instructions or requests are found, the processing proceeds to step S13, but if not, the processing returns to step S2. In step S13, whether such instructions or requests include printing operation is determined. If printing operation is requested, the processing proceeds to step S14, and if operations other than printing operation is requested, the processing proceeds to step S15.

In step S14, whether or not a flag (DIS/ENB) is set is determined. If the flag is set, it is determined that the apparatus is not yet in the print-enable state and the processing returns to step S2. By this, for example, even if a facsimile image is received and printing operation is requested to output the received image, printing operation will not be performed and the received data is kept stored in the RAM 8. On the other hand, if the flag (DIS/ENB) is reset, it is determined that the apparatus is now in the print-enable state and the processing proceeds to step S15 where the instructed or requested operation is executed. After performing the process in step S15, the processing returns to step S2.

According to the embodiment as described above, when an ink cartridge is exchanged, an inspection pattern is outputted on a print sheet after preliminary discharge and recovery operation are performed by the newly-exchanged ink cartridge. Then printing operation can be executed after a user verifies quality of the printed image.

<Second Embodiment>

In the second embodiment, description will be given in a case where verification of the inspection pattern is performed automatically, in contrast to the verification performed by visual confirmation of a user as described in the first embodiment.

Figure 8:
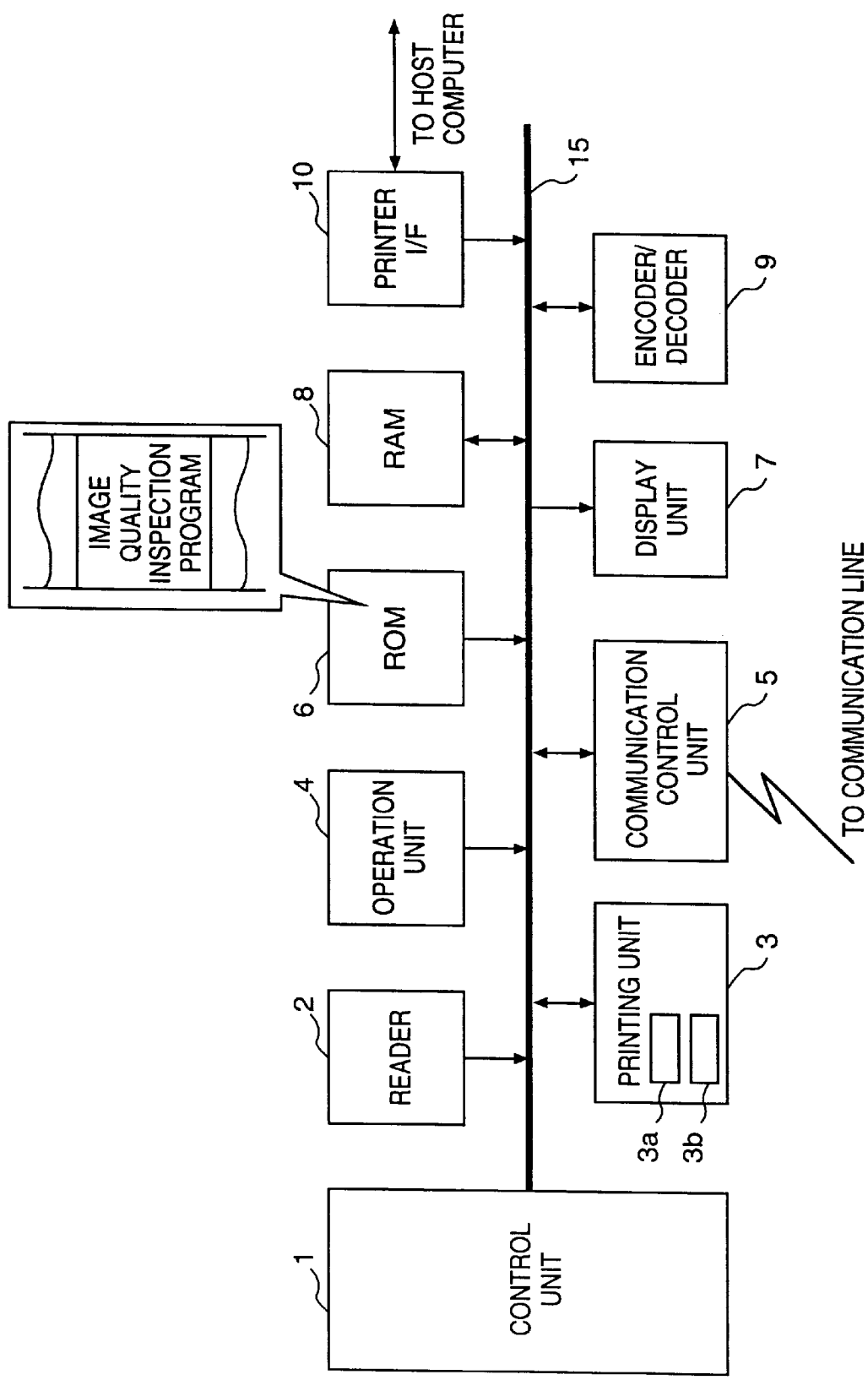
FIG. 8 is a block diagram showing a structure of a facsimile apparatus according to a second embodiment.

FIG. 8 is a block diagram showing a structure of a facsimile apparatus according to the second embodiment. Since configurations of both apparatuses are basically the same as apparent from comparison between FIG. 8 and FIG. 2, the same reference numeral is assigned to those components that are common to both apparatuses and descriptions thereof will not be repeated. The following descriptions will be given only for those elements characteristic to the second embodiment.

In FIG. 8, reference numeral 3b is a print quality inspection sensor which inspects the quality of a printed image by irradiating light on a printed surface of a print sheet and examining the reflected light.

Figure 9:
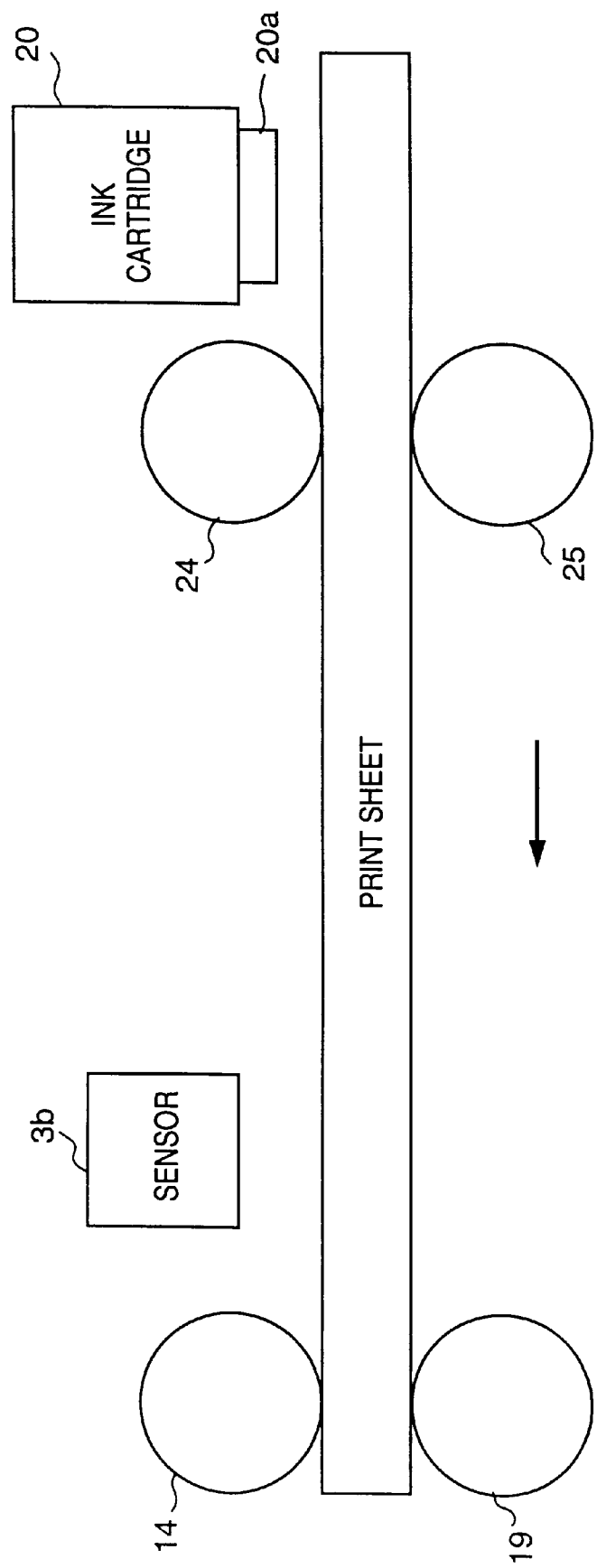
FIG. 9 is a partially enlarged side view of the facsimile apparatus in FIG. 1 illustrating automatic image-quality inspection of a printed image.

FIG. 9 illustrates how image quality inspection of a printed image is automatically observed. In FIG. 9, reference numeral 20 denotes an ink cartridge integrating a printhead and ink tank; 20a, a printhead; and 14, 19, 24 and 25, a conveying roller for conveying a print sheet.

With the above configuration, a print sheet is conveyed in a direction of an arrow indicated in FIG. 9 after an inspection pattern which will be described later is printed by the printhead 20a, light is irradiated on a printed surface when the print sheet on which the inspection pattern is printed is conveyed directly under the print quality inspection sensor 3b, and the reflected light is read for inspecting the quality of the printing.

Figure 10:
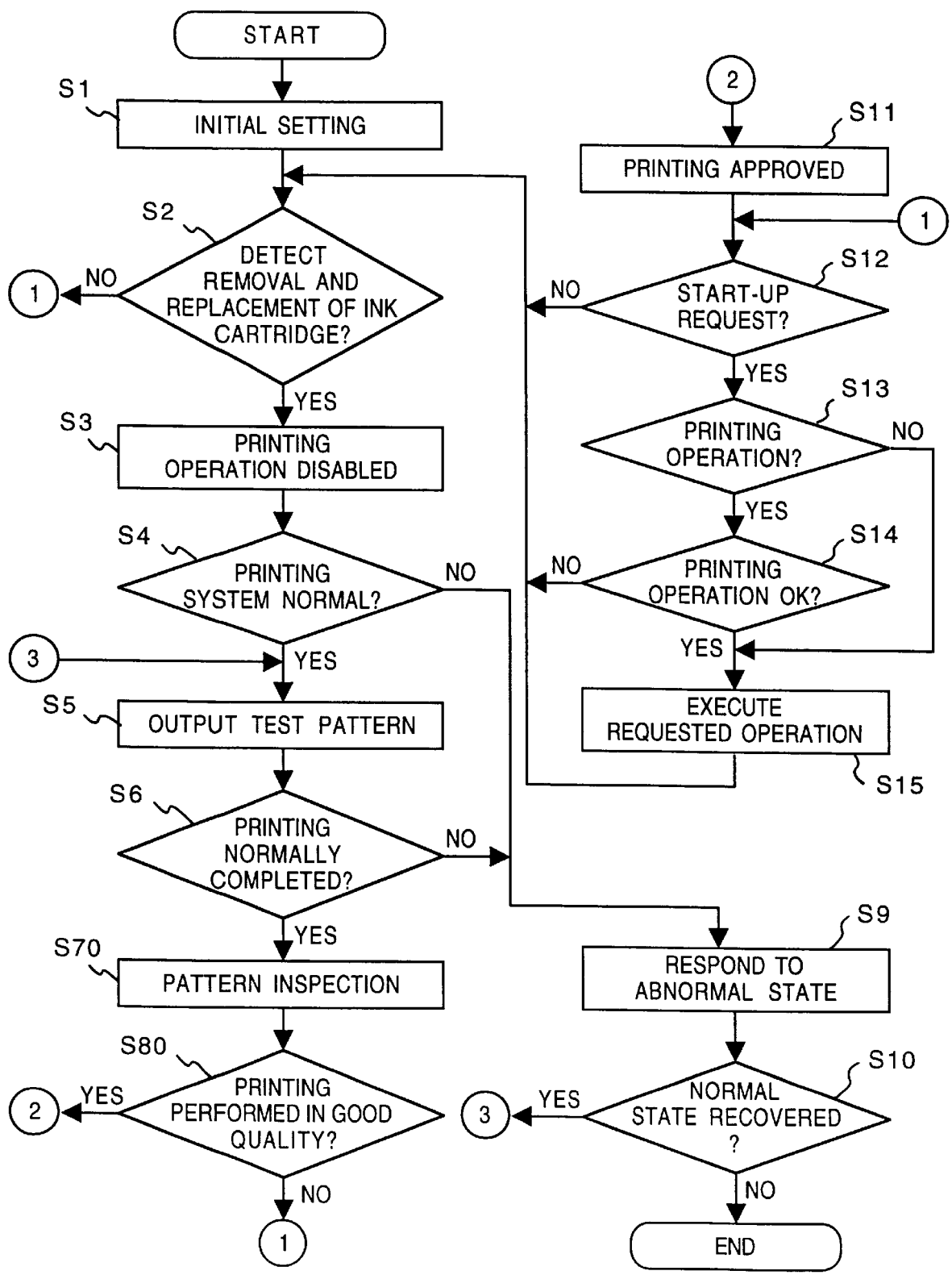
FIG. 10 is a flowchart explaining a processing of inspecting quality of a printed image according to the second embodiment.

Next, image quality inspection processing according to the second embodiment will be described with reference to the flowchart shown in FIG. 10. Note that the processing is performed by executing an image quality inspection program stored in the ROM 6. For the same process steps to those in the first embodiment, the same step reference numeral is assigned in the flowchart in FIG. 10, and descriptions thereof will be omitted. Hereinafter, processing steps that are characteristic to the second embodiment will be explained.

After the processing of steps S1 to S4, in step S5, an inspection pattern consisting of plural strips 25 to 28 as shown in FIG. 11 printed on a print sheet is outputted, taking the characteristic of the print quality inspection sensor 3b into consideration. The printing width of each of the strips 25 to 28 in the sub-scanning direction corresponds to a printing width of the printhead. By virtue of this feature, all nozzles provided in the printhead is utilized in the printing. If a nozzle causing a discharge failure exists, a thin line appears in the inspection strips printed on the print sheet, as indication of printing failure. After completing the processing in step S6, print quality of the inspection pattern is checked by the print quality inspection sensor 3b in step S70.

When the print quality inspection sensor 3b receives the reflected light from the inspection pattern, a reflected light intensity value holds virtually stable as long as the printing is normal. However, if there is a nozzle causing discharge failure, the non-discharging state of the faulty nozzle can be seen from variance of the reflected light intensity. Accordingly, in step S70, the MPU monitors such unexpected variance based on the reflected light intensity data sent from the print quality inspection sensor 3b. Moreover, in step S80, determination is made from the variance whether or not the printing is performed in good quality. Herein, if the printing is determined to be in good quality, the processing proceeds to step S11; but if printing is determined to be not in good quality, the processing proceeds to step S12.

A similar processing to that of the first embodiment is executed thereafter.

According to the foregoing embodiment, an inspection pattern on a print sheet is outputted, the outputted result is detected by a sensor, and whether or not printing is performed in good quality can be automatically determined.

Note that in the first and second embodiments, print quality is confirmed by outputting an inspection pattern aside from the normal printing operation; however, it may also be confirmed by a user by printing the inspection pattern on the printed surface of a printing medium on which initial printing operation is performed after an ink cartridge is exchanged. Alternatively, automatic inspection by an apparatus may be applied.

In the second embodiment, the print quality inspection sensor 3b for reading a pattern printed by the printhead 20a is not limited to the configuration shown in FIG. 9. For example, in the configuration shown in FIG. 9, the printhead 20a may be situated between the conveying rollers 14, 19 and 24, 25, and the print quality inspection sensor 3b is situated in the downstream side of the printhead 20a along the conveyance path of a print sheet. Further, with regard to the print quality inspection sensor 3b, a full-line type photosensor which is capable of reading an entire width of a print sheet in the width direction of the print sheet or a serial-scan type photosensor, which is similar to a serial type printhead, capable of reading an image pattern at a predetermined width by serially scanning a print sheet may be applicable to the present invention. Moreover, a configuration is applicable to the present invention where a photosensor is arranged on a carriage having a printhead and an image pattern is read by scanning the carriage.

Each of the embodiments described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only a cartridge type printhead in which an ink tank is integrally arranged on the printhead itself, but also an exchangeable chip type printhead, which can be electrically connected to the apparatus main unit and can receive ink from the apparatus main unit upon being mounted on the apparatus main unit can be applied to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is liquid. Alternatively, the present invention may employ ink which is solid at room temperature or less, or ink which softens or liquefies at room temperature, or ink which liquefies upon application of a use printing signal, since it is a general practice to perform temperature control of the ink itself within a range from 30° C. to 70° C. in the ink-jet system, so that the ink viscosity will fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, in addition to an image output terminal integrated to or as a separate unit of an information processing equipment such as a computer.

The present invention can be applied to a system constituted by a plurality of devices, or to an apparatus comprising a single device. Furthermore, the invention is applicable also to a case where the object of the invention is attained by supplying a program to a system or apparatus. In this case, memory medium storing a program according to the present invention will constitute the present invention. By reading out the program from the memory medium to a system or an apparatus, the system or apparatus performs in a predetermined operation.

As many apparently widely different embodiments of the present invention can be made without departing from the spirit and scope thereof, it is to be understood that the invention is not limited to the specific embodiments thereof except as defined in the appended claims.

What is claimed is:

1. An ink jet printing apparatus for performing a printing operation on a printing medium by discharging ink from a printhead, the apparatus comprising:

an ink cartridge, removable from the apparatus, for storing the ink;

a detector for detecting removal and attachment of said ink cartridge;

recovery means for recovering a discharge condition of the printhead by exhausting ink from the printhead; and control means for controlling, when said detector detects that said ink cartridge has been removed and then said ink cartridge or another ink cartridge has been attached, said recovery means to perform a recovery operation, and subsequently causing printing of a predetermined pattern on the printing medium utilizing the attached ink cartridge.

2. The apparatus according to claim 1, further comprising a processor for determining whether or not subsequent printing is to be performed after printing the predetermined pattern.

3. The apparatus according to claim 2, wherein said processor notifies a message which requests a determination be made by a user of the apparatus, and further comprising an operation unit for the user to input a user instruction to the apparatus.

4. The apparatus according to claim 2, further comprising a sensor for inspecting the printed predetermined pattern, and wherein said processor makes a determination according to a result of inspection by said sensor.

5. The apparatus according to claim 4, wherein said sensor includes a reflective type photosensor, and said sensor inspects print quality of the printed predetermined pattern according to light intensity received by said reflective type photosensor.

6. The apparatus according to claim 5, further comprising a conveyance unit for conveying the printing medium, and wherein said printhead and said reflective type photosensor are arranged on a conveyance path of the printing medium, and said reflective type photosensor is arranged in a downstream side of the printhead along the conveyance path.

7. The apparatus according to claim 2, further comprising:

a communication unit for performing a facsimile communication utilizing a communication line; and a memory for storing data received through the communication line by said communication unit.

8. The apparatus according to claim 1, wherein when it is determined by said processor that the subsequent printing is not to be performed, if data is received, the received data is stored in said memory.

9. The apparatus according to claim 1, wherein said printhead comprises plural nozzles which discharge ink, and the predetermined pattern is printed by ink discharge from all of said plural nozzles.

10. The apparatus according to claim 1, wherein said print controller controls printing operation to be temporarily disabled according to the detection result of said detector.

11. The apparatus according to claim 1, wherein said printhead and said ink cartridge are integrated as a unit.

12. The apparatus according to claim 1, wherein said printhead discharges ink by utilizing heat energy, and comprises heat energy transducer for generating heat energy to be provided to ink.

13. The apparatus according to claim 1, wherein said apparatus includes a facsimile apparatus.

14. A print control method operative in an ink jet printing apparatus for performing a printing operation on a printing medium by discharging ink from a printhead and an ink cartridge, removable from the apparatus, for storing ink, the method comprising the steps of:

detecting removal and attachment of the ink cartridge; and controlling the apparatus, when said detecting step detects that the ink cartridge has been removed and then the ink cartridge or another ink cartridge has been attached, to cause exhausting of ink from the printhead to recover a discharge condition of the printhead, and subsequently to cause printing of a predetermined pattern on the printing medium utilizing the attached ink cartridge.

15. The method according to claim 14, further comprising the step of determining whether or not subsequent printing is to be performed after printing the predetermined pattern.

16. The method according to claim 14, further comprising the steps of:

notifying a message which requests a determination be made by a user of the apparatus as to whether or not subsequent printing is to be performed after printing the predetermined pattern, and determining whether or not the subsequent printing is to be performed according to a user information.

17. The method according to claim 14, wherein the printhead discharges ink by utilizing thermal energy.

* * * * *

UNITED STATES PATENT AND TRADEMARK OFFICE
CERTIFICATE OF CORRECTION

PATENT NO. : 6,106,086
DATED : August 22, 2000
INVENTOR(S) : Teruyuki Nishii

It is certified that error appears in the above-identified patent and that said Letters Patent is hereby corrected as shown below:

Column 2,
Line 44, change "taken-in" to -- taken in --.

Column 12,
Line 44, change "Claim 1" to -- Claim 7 --.

Signed and Sealed this

Twenty-eighth Day of August, 2001

*Attest:*

NICHOLAS P. GODICI
*Attesting Officer*   *Acting Director of the United States Patent and Trademark Office*